2,720,569

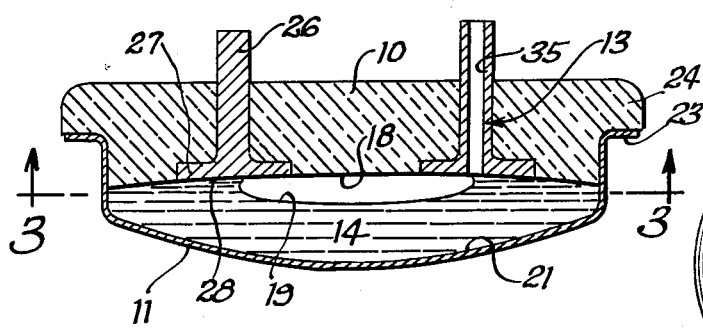
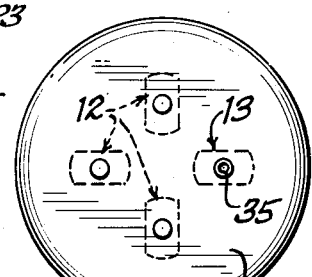
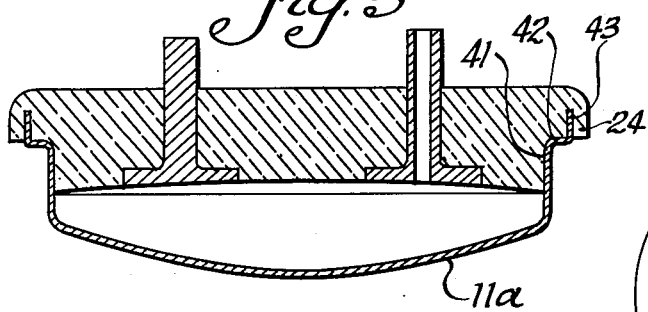
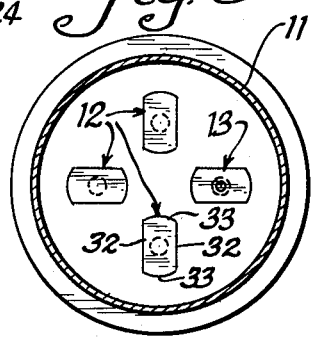
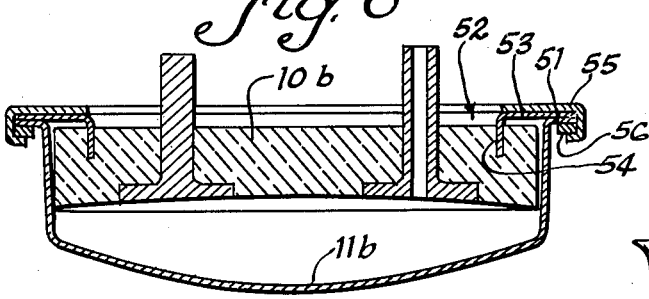
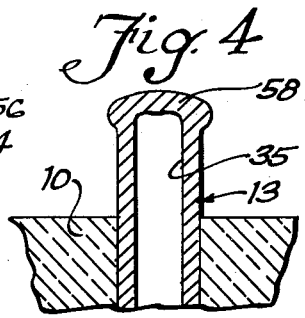
INVENTORS:
John F. Schoeppel
James R. Andres
Stuart L. Varner Oct. 11, 1955  J. F. SCHOEPPEL ET AL  2,720,569
ELECTROLYTIC SWITCH AND METHOD OF FILLING
AND CLOSING THE SAME
Filed July 10, 1952  2 Sheets-Sheet 2
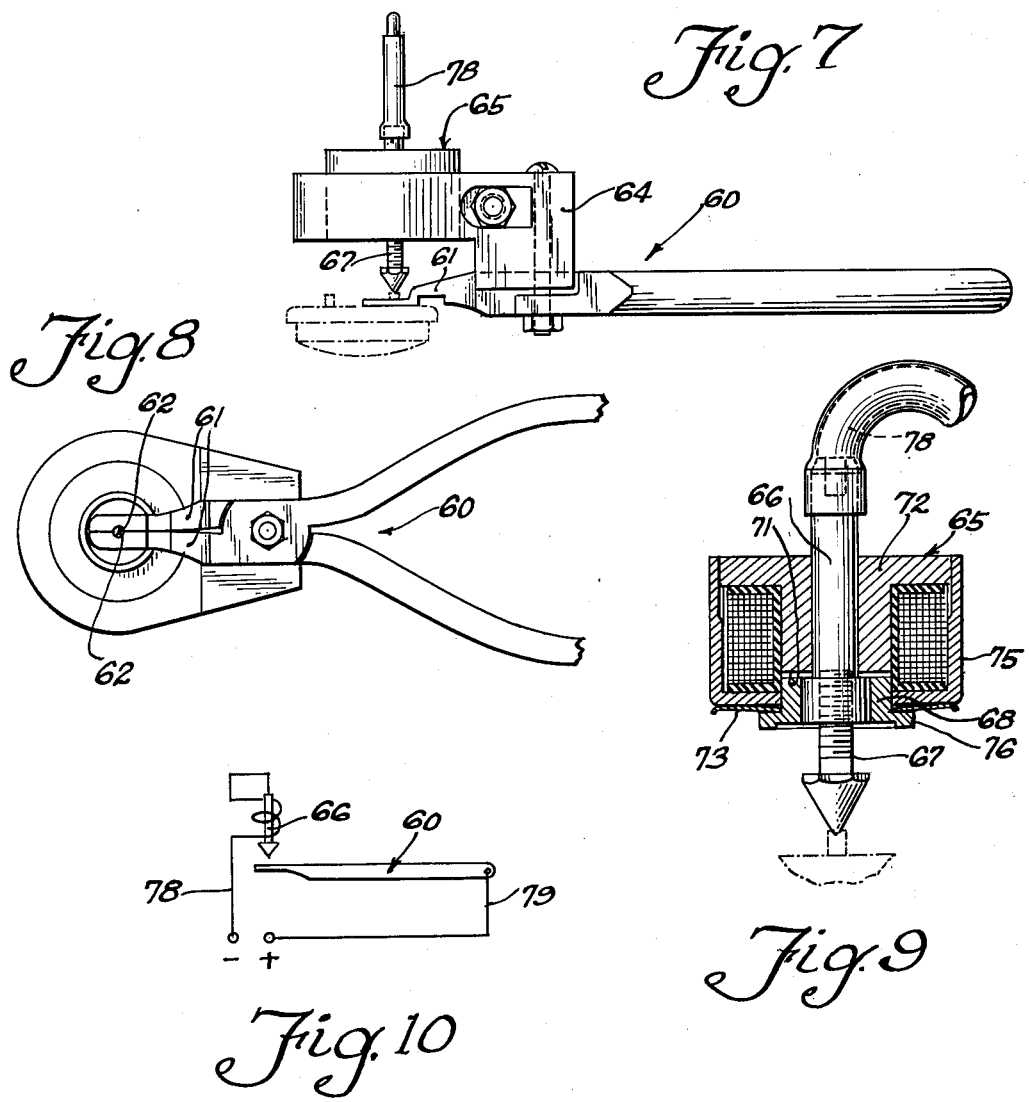
INVENTORS:
John F. Schoeppel
James R. Andres
Stuart L. Varner
BY
Attorney United States Patent Office 2,720,569
Patented Oct. 11, 1955

ELECTROLYTIC SWITCH AND METHOD OF FILLING AND CLOSING THE SAME

John F. Schoeppel, Stuart L. Varner, and James R. Andres, Grand Rapids, Mich., assignors to Lear Incorporated, Grand Rapids, Mich., a corporation of Illinois Application July 10, 1952, Serial No. 298,175

8 Claims. (Cl. 200—152)

This invention relates to an electrolytic switch. In particular it relates to a gravity-responsive electrolytic switch adapted to be carried on a gyratory support for sensing departure of the vertical axis of the switch from a predetermined normally vertical position, and whereby the amount of such departure measured as an angle with respect to true vertical and as an angle in a horizontal plane may be translated into an electrical signal.

Switches of the general character aforesaid are often utilized to indicate, through a suitable signalling system, the departure of the vertical axis of a gyroscope from true vertical, and to that extent have largely replaced pendulous devices of sensible inertia and capable of indicating such departure only crudely. In such case the switch is fixedly mounted on the rotor housing.

The use of gyroscopes in aircraft, guided missiles and other applications has accelerated greatly in recent years, and has been accompanied by a demand for accuracy far beyond that which was deemed good practice prior to that time. For example, it is not uncommon presently to encounter specifications for gyroscopic instruments in which departure of the vertical axis, e. g. the rotor axis, from true vertical must be sensed for angles as low as ±0.05°. Such accuracy, in turn, dictates the use of devices which will measure the amount and sense of angular departure of a reference plane, e. g. a horizontal plane perpendicularly disposed to the rotor axis, with respect to mutually perpendicular second and third reference planes; which will provide a linear or nearly linear electrical signal output, i. e. the output voltage shall be a constant multiplied by the angular deflection, at least for the range over which the device is expected to function; and which device, when comprising two pairs of contacts, will substantially maintain the rated sensitivity to angular deflection on one pair of diametrically opposed contacts when the other pair is reflected, and vice versa.

Accordingly certain of the objects of our invention reside in providing an electrolytic switch having the foregoing desiderata.

Another object is to provide a switch which utilizes a mobile mass of electrically-conductive fluid which is cooperative with two pairs of diametrically opposed contacts for converting the position of the switch into a potential which is a measure of such position, and the active face of which contacts are of novel form to provide a signal which is linear with respect to angular deviation.

A further object resides in constructing the switch body in such manner as to avoid leakage of the electrolyte.

Another object is to provide a switch having great physical stability against dimensional changes which might otherwise alter the predetermined characteristics of the switch, and such as may occur due to variation in ambient temperature and aging of the materials of which the switch is constructed.

Still a further object resides in the provision of a switch of the class referred to which comprises a glass body and a metallic cup defining therewith a space for reception of the electrolyte, and so constructed that extremes of cold and heat are relatively ineffective to cause defective functioning thereof.

Additional objects lie in providing a passage for introducing electrolyte into the switch, and in a method of closing the mouth of such passage following the employment thereof, without the hazard of contaminating the electrolyte.

Another object resides in the method of introducing the proper amount of electrolyte into the switch cavity.

Other objects will appear from the following description taken with the accompanying drawing, in which latter:

Fig. 1 is a vertical medial cross section through our improved switch;

Fig. 2 shows a top plan view thereof;

Fig. 3 is a cross section thereof taken on the line 3—3 of Fig. 1;

Fig. 4 is a cross-sectional detail showing the mode of closing the filling passage;

Fig. 5 is a view similar to Fig. 1 but of an alternative construction;

Fig. 6 is also a view similar to Fig. 1, and showing another modified construction;

Fig. 7 is a side elevation of an implement for use with the passage-closing operation;

Fig. 8 is a fragmentary bottom plan view of the implement of Fig. 7;

Fig. 9 is a cross section, on a somewhat enlarged scale, of the solenoid device of the implement of Fig. 7; and Fig. 10 is a schematic representation of certain features of the implement of Fig. 7.

Generally regarded, the invention, in one aspect, comprehends a switch including a glass body of generally cylindrical configuration and having a segmentally spherical interior face for contact by the electrolyte. To define a space or cavity for reception of the electrolyte a metallic cup is incorporated with the body in a fluid-tight manner. The customary four contacts are equidistantly spaced on the corners of a square which may be regarded as having a center positioned on the vertical axis of the switch, and the contacts are embedded in the glass body. In order to achieve the desired linear response the working faces of the contacts, i. e. the surface which is in contact with the electrolyte, are substantially rectangular with one pair of sides parallel with the diagonals of the square. The electrolyte is introduced into the cavity in a measured quantity to provide a meniscus of predetermined mean diameter and in order to insure that each contact is covered by fluid to a specified extent when the switch is in neutral position.

In another aspect the invention contemplates a method of introducing the electrolyte into the switch cavity through a bore in one of the contacts, and thereafter closing the entrance of the bore in a manner calculated to avoid contamination of the electrolyte.

At the outset it will be appreciated that an electrolytic switch intended for use with a gyroscope for sensing angular deviation thereof from the direction of apparent gravity, i. e. true vertical, must be characterized by the greatest possible degree of accuracy. Gyroscopes are often used for sensing the instantaneous attitude of an airplane in pitch and roll and for providing, in conjunction with other apparatus, the pilot with an indication thereof, e. g. an horizon instrument. In such applications not only must the electrolytic switch, which provides the indication, be rapid in response, but must desirably provide an output which is linear with respect to angular deviation, both features performing uniformly and reliably over an extended period of time without the need for servicing.

It has been found that electrolytes heretofore employed will attack practically every plastic composition which has been found otherwise suitable as a switch body and in which the contacts may be carried thereby to expose a gradually increasing area of the contacts, and consequent unreliable response. Moreover, with prior modes of loading the switch with electrolyte and closing the opening through which the liquid is introduced contamination of the electrolyte is inevitable. Our experience has brought out that, in order to meet the rigid performance specifications of aircraft instruments in particular, there can never be an excess of meticulosity. The several features of our invention are designed not only to provide a switch capable of meeting the most rigid specifications, but of providing continuously uniform performance in the desired directions over an extended period of time.

Turning now to the drawings Figs. 1, 2 and 3 show an electrolytic switch in accordance with our invention which comprises a body 10, a cup 11, contacts 12 and 13, and an electrolyte 14.

In order to obtain suitable behaviour of the meniscus 19 it has been determined that the under surface 18 of the body 10 shall conform substantially to the curvature of a sphere, and that a quantity of electrolyte be employed to provide a meniscus of mean diameter such that, in the level position of the switch, a proper null current may be passed. By "mean diameter" we refer to the diameter of the meniscus measured at that circumferential element which adjoins the surface 18. It will be understood that the switch depends for its functioning on the relative coverage of the several contacts by the fluid, and that this coverage will vary as the switch is tilted during operation.

In order to insure against attack on the walls of the cavity 21 by the electrolyte we prefer to employ glass for the body 10 and 5% iridium-platinum for the cup 11. Furthermore, as will be apparent, these two materials possess substantially the same temperature coefficient of expansion, and may therefore be fused without any prospect of severance of the joined surfaces under temperature change.

One method of securing the body 10 and cup 11 comprises the formation of substantially horizontal flanges 23 and 24 respectively, and fusion of the same by heat. Inasmuch as the particular composition of the glass comprising the body 10, and the mode of effecting said fusion form no part of our invention per se elaboration thereof is deemed unnecessary. Filling of the cavity 21 with a suitable electrolyte will be described hereinafter.

Sensing of the angular displacement of the switch from a horizontal reference plane, i. e. level position, is accomplished through the medium of preferably four, 5% iridium-platinum contacts 12 and 13 arranged with their centers on the corners of a square and coactive with the electrolyte to vary the current flow through one diagonally opposite pair in comparison with the conductivity through the other diagonally opposite pair. For example, when the switch is arranged for cooperation with a vertical gyroscope, one pair of contacts may sense roll displacement of an aircraft, and the other pair displacement in pitch, the relative conductivities being translatable, through suitable electrical means, into an indication of all possible combinations of displacement in roll and pitch. The contacts are preferably in the form of a shank 26 and a head 27 which are embedded in the glass body at the time of molding thereof. In order to provide an uninterrupted spherical face 18 it is preferred to preliminarily form the exposed or working faces of the several heads 27 in a plane perpendicular to the axis of the shank, and subsequently to grind or otherwise machine the spherical surface 18 of the glass and contacts in a single operation. The protruding outer ends of the shanks 26 allow the conductors (not shown) to be connected thereto.

As noted hereinbefore linear response is an important desideratum of a switch of the class here described. That is to say, the conductivity, and hence the current through the switch, across one pair of contacts or the other is desirably linear with respect to angular displacement from true vertical of an axis vertically through the center of the switch. In the instant invention such result is achieved by forming the faces 28 of substantially rectangular configuration in order to provide two sides 32—32 which are parallel to the diagonal of the square upon the corners of which the contacts are, for convenience of this specification, deemed to be disposed. Thus the whole face may be regarded as rectangular or substantially so, for the reason directly to be explained, that the remaining edges 33—33 may be curved, straight or of other configuration. Inasmuch as it is convenient to form the contacts 12 and 13 on a screw machine, and then to straddle-mill the straight sides 32—32, the net effect is that the other edges are arcuate. While it is within contemplation to make these faces 33—33 mutually parallel and perpendicular to the edges 32—32 tests heretofore made show no justification for this step, and the expense of doing so is likewise unjustified.

For some applications it may be desirable to employ one pair or more than two pairs of diagonally disposed contacts. However in the case of a plurality of pairs it will be understood that the members of each pair will be positioned at the ends of one of the diagonals of an even-sided polygon.

Where in the description and claims we refer to the "center" of the contacts we mean the point of intersection of the diagonals thereof, regarding the outline as rectangular.

In order to introduce the proper measure of electrolyte into the switch cavity at least one of the contacts, say 13, is bored axially, as at 35, to permit the insertion of a hypodermic needle or similar syringe, and the expression therefrom of a volume of electrolyte which will define a meniscus calculated to provide the desired response. In practice we prefer to hold the switch in a jig or gimbal which may be tilted in all directions to measure the conductivity across related contacts of each of the pairs as the fluid is introduced. It is obvious that any excess may be withdrawn by the same syringe. By this procedure filling may be interrupted at the point where the response for all deviations measures up to predetermined standards. Following this operation the bore 35 is closed by a method to be described hereinafter.

Although the composition of the electrolyte forms no part of the invention per se it is apparent that a formula which is characterized by chemical stability, and therefore unimpaired uniformity of electrical resistance per unit volume over an extended period of time is the optimum desideratum. A preferred formula is disclosed in the commonly owned co-pending application of John F. Schoeppel et al., Serial Number 271,976, filed on February 16, 1952. By using relatively inert constituents, such as glass and iridium-platinum for those parts of the switch in contact with the electrolyte corrosion of the switch parts and contamination of the electrolyte is virtually eliminated.

If greater sensitivity is desired the same may be attained by increasing the distance between the faces 32—32 and vice versa. The sensitivity, with any given shape of contact face, may also be varied by changing the radius of the spherical face 18, i. e. the greater the radius, the greater the sensitivity, up to the limit whereat the meniscus becomes unstable.

By way of comparison, it is pointed out that the circular working faces of the contacts of presently known electrolytic switches fail to provide the linear change in conductivity obtained with the parallel-sided contact faces of the invention. Circular contacts are also found to lose sensitivity to angular deflection on one pair of diagonally opposite contacts as the other pair is deflected, for the reason that the meniscus extends over a greater area on each contact, resulting in a lower percentage change in area, as compared to straight-sided contacts wherein the meniscus clears the contact with the flat sides except for a minute controlling area on the outer edge.

Modified constructions are shown in Figs. 5 and 6. In the former the cup 11a is not fused to the glass body at 41 and 42 in a manner similar to the embodiment of Fig. 1, but instead an upwardly directed flange 43 is embedded in the flange 24. Otherwise the switches are identical.

In the form of switch shown in Fig. 6 the cup 11b is carried upwardly around the substantially wafer-shaped switch body 10b and terminates in a radially-extending flange 51. Surmounting this flange is an annular member 52 including a horizontal flange 53 and an axially extending rim 54 which is embedded in the glass body 10b. A clamping ring 55 and washer 56 serve to support the flanges 51 and 53 after they have been seam-welded into fluid-tight engagement.

Although not illustrated, it will be understood that the complete switch is rigidly mounted in a suitable support forming part of the device whose angular deflection is to be sensed, or is suitably clamped thereto.

After the proper amount of electrolyte is introduced into the cavity 21 the upper opening of the bore 35 is closed to provide a hermetically sealed end 58 (Fig. 4), and by a means and method now to be described.

A holder 60 (Figs. 7 and 8), for example, a re-worked pair of pliers is provided with jaws 61—61, which are semi-circularly notched at 62—62 to fit and to grip the protruding stem or shank 26 of the contact 13, this latter being shown in phantom in Fig. 7.

Carried above the jaws 61—61 is a bracket 64, which in turn supports a solenoid 65 (Fig. 9). The plunger 66 of the solenoid has a copper electrode 67 adjustably carried therein. An enlarged portion 68 of the core is adapted, when the solenoid is energized, to abut the bottom face 71 of the core 72 of the solenoid. A retracting spring, in the form of a resilient dished washer 73 is interposed between the outer core portion or shell 75 and a flange 76 in order to bias the plunger 66 outwardly. Welding current is brought to the electrode 66 through a conductor 78, and to the work piece, i. e. the contact 13, by another conductor 79 connected to the jig or clamp 60.

It will be noted that the lower extremity of the electrode 67 is conical and slightly rounded off and, in the deenergized condition of the solenoid, rests upon the open end of the bore 35. By means of a suitable switch (not shown) and circuit (Fig. 10) a pulse of current is applied to the welding electrodes and to the solenoid simultaneously. Thus the plunger 66 is withdrawn into the solenoid against the force of the spring 73 to draw an arc between the tip of the electrode 67 and the shank of the contact 13 to fuse the metal of the latter into a closure, best seen in Fig. 4. Since, under these circumstances, the molten metal tends to flow into the arc and then solidifies as the electrode tip recedes from the site, there is little or no likelihood of contamination of the electrolyte as the closure is effected. By way of comparison a soldered closure has been found unsatisfactory since the flux tends to enter the bore 35 and to contaminate the electrolyte.

Direct current is employed for welding, and the duration of the welding cycle is controlled to yield uniformity from one switch to the next. By utilizing a substantial mass of metal as the fixed electrode the heat of the arc is rapidly dissipated, and thermal shock to the switch assembly is thereby avoided.

As an alternative a glass tubulation may be fused into the top surface of the switch body, the switch filled therethrough and the tubulation thereafter pinched off under a flame in a common manner. Similarly a metal tubulation may be embedded in the glass body and closed by welding in the manner just explained.

Further non-contaminating methods of closure comprise a spot welding operation, with the pressure of the electrodes applied at diametrically opposed points of the shank of the contact 13; or by cold welding the collapsed wall of the shank.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. An electrolytic switch of the class described comprising a body of electrically-insulating material, a cup-like part secured to said body and defining therewith a space for reception of a predetermined quantity of electrically-conductive liquid, and at least one pair of spaced-apart contacts adapted to form part of an electrical circuit which includes said liquid, each contact having a substantially rectangular active face, the longer sides whereof are disposed substantially parallel to a line joining the centers of the contact faces.

2. An electrolytic switch of the class described comprising a body of electrically-insulating material, a cup-like part secured to said body and defining therewith a space for reception of a predetermined quantity of electrically-conductive liquid, the interior face of the cupped wall of said space being spherically concave downward and the quantity of said fluid being such as to form a meniscus of predetermined mean diameter with respect to said face, and at least one pair of electrically-conductive elements embedded in and flush with said face, each of said elements having a substantially rectangular contour, the longer edges whereof are parallel to a line joining the centers of the elements.

3. An electrolytic switch of the class described comprising a body of insulating material, a cup-like part secured to said body and defining therewith a space for reception of a predetermined quantity of electrically-conductive liquid, and four contacts adapted to form part of an electrical circuit which includes said liquid, the contacts each being positioned at a corner of a square and having a substantially rectangular active face, at least two parallel sides of said face being parallel to a diagonal of the square.

4. An electrolytic switch of the class described for sensing departure of a vertical axis of the movable switch support from true vertical comprising a body part for securement to the support, a cup-like part attached to said body part and defining therewith a space for receiving a predetermined quantity of fluid electrolyte, the compartment having an upper wall provided with a downwardly concave face and the configuration of said wall and the quantity of electrolyte being so related as to provide a circular meniscus of predetermined mean diameter, a plurality of contacts carried in said body having faces exposed to said electrolyte and so positioned with respect to said meniscus as to cause a predetermined area of each of said faces to be covered by the electrolyte in the vertical position of the switch, said faces having an outline which includes at least one pair of substantially parallel edges, and said edges being parallel to a diameter of the meniscus intersecting said vertical support axis when the said support axis coincides with true vertical.

5. An electrolytic switch of the class described comprising a body, a cup-like part joined to said body and defining therewith a substantially cylindrical closed compartment for receiving the electrolyte, the interior face of the upper wall of said compartment having a segmentally spherical configuration which is concave downward, and a plurality of electrical contacts insulatedly mounted in said body and having active surfaces flush with said face, the said surfaces all having the same outline and each having its center positioned at the corners of a regular polygon, each said surface having a principal axis and all said axes extended meeting at the center of the polygon and said center being positioned on the vertical equatorial plane of the sphere.

6. In the manufacture of an electrolytic switch of the class described having a walled structure defining a space for receiving the electrolyte and at least one pair of symmetrically-disposed contacts insulatedly supported in said structure, at least one of said contacts having a hollow supporting stem, the method which comprises supporting the switch in a universal gimbal, introducing a predetermined approximate quantity of electrolyte into said space by means of a syringe having a nozzle for insertion through said hollow stem, connecting a source of current and current indicating means to a selected pair of contacts to complete a circuit through said source, indicating means and said pair of said contacts, swivelling the switch on said gimbal to simulate various of the attitudes the switch will occupy in utlimate use, and adding to or withdrawing a part of said electrolyte by means of said nozzle as required in said simulated attitudes until individual predetermined responses are obtained on said indicating means as a circuit is completed through said contacts in all of said attitudes.

7. In the manufacture of an electrolytic switch of the class described having a walled structure defining a space for receiving the electrolyte and at least one pair of symmetrically-disposed contacts insulatedly supported in said structure, at least one of said contacts having a hollow supporting stem, the method which comprises supporting the switch in a universal gimbal, introducing a predetermined approximate quantity of electrolyte into said space by means of a syringe having a nozzle for insertion through said hollow stem, connecting a source of current and current indicating means to said contacts to complete a circuit through said source, indicating means and said contacts, swivelling the switch on said gimbal to simulate various of the attitudes the switch will occupy in utlimate use and adding to or withdrawing a part of said electrolyte by means of said nozzle as required in said simulated positions until individual predetermined responses are obtained on said indicating means as a circuit is completed through said contacts and, following withdrawal of said nozzle, effecting closure of the outer opening of said stem by rigidly clamping said stem and welding said closure.

8. In the manufacture of an electrolytic switch in which a body of liquid electrolyte is adapted to complete an electrical circuit by contact of the electrolyte with predetermined areas of the electrodes dependent upon the angular deviation of the switch from a vertical normal axis and said switch having a filling tube, the method which comprises the steps of mounting the switch in a tiltable support, tilting the switch in said support to simulate various of the attitudes the switch will occupy in ultimate use, alternately introducing and withdrawing electrolyte through the tube substantially repeatedly in all of said simulated attitudes, measuring the electrical response of a measuring circuit including the electrodes and electrolyte in all of said attitudes and, following the attainment of a desired response, closing the entrance of said tube.

References Cited in the file of this patent

UNITED STATES PATENTS

| | | |
|---|---|---|
| 1,042,565 | Kroner | Oct. 29, 1912 |
| 2,177,498 | Payne | Oct. 24, 1939 |
| 2,376,377 | Muma | May 22, 1945 |
| 2,387,313 | Wilson | Oct. 23, 1945 |
| 2,677,033 | Smith | Apr. 27, 1954 |